Aug. 12, 1941.   J. D. BELL   2,252,156
PRESSURE DRIVE MECHANISM
Filed Sept. 20, 1939   2 Sheets-Sheet 2
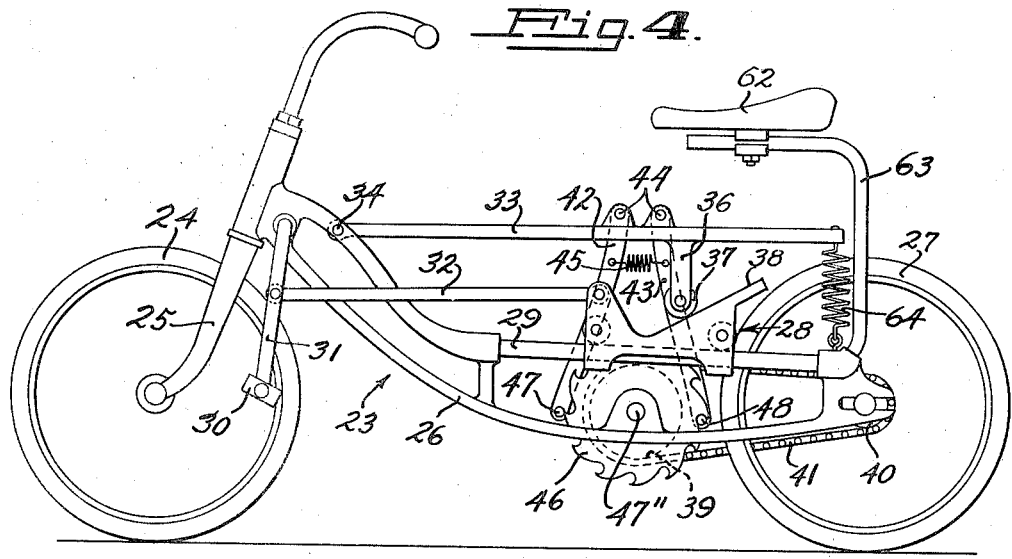
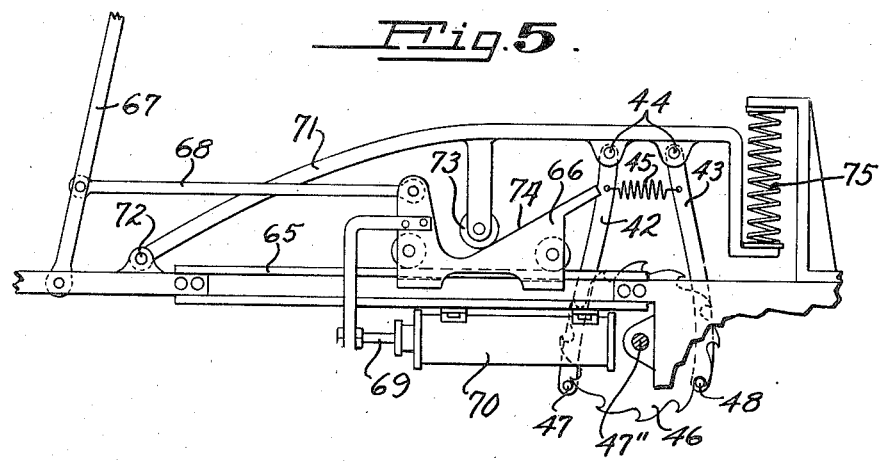
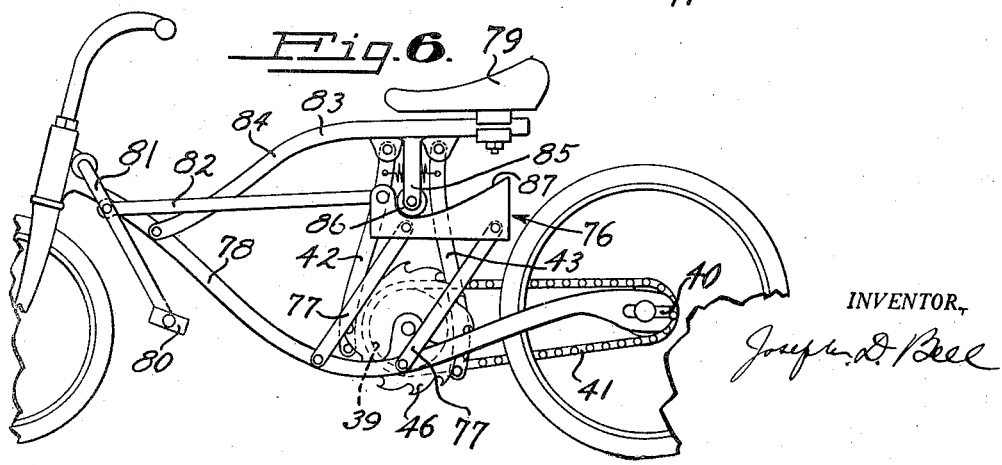
INVENTOR,
Joseph D. Bell Patented Aug. 12, 1941

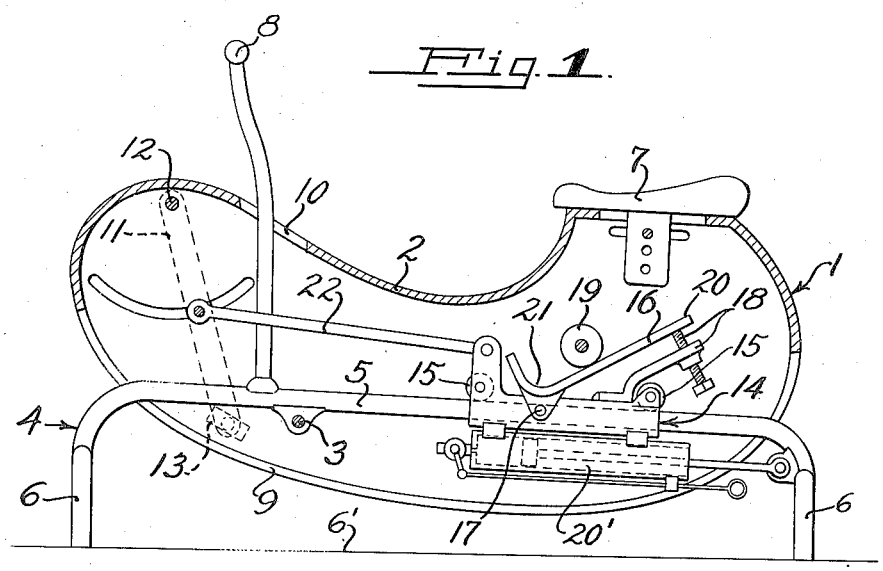

2,252,156

UNITED STATES PATENT OFFICE 2,252,156

PRESSURE DRIVE MECHANISM

Joseph D. Bell, San Francisco, Calif.

Application September 20, 1939, Serial No. 295,739

20 Claims. (Cl. 74—99)

The present invention relates to improvements in pressure drive mechanisms and has among its objects the provision of a mechanical movement adapted for the continuous application of power to a drive member at a substantially uniform pressure.

In the ordinary bicycle, for instance, power can be applied to each foot pedal only during a limited portion of the stroke of the pedal while the latter is traveling downwardly. Power cannot be imparted to the pedal during its upward stroke by the rider, nor while the pedal is passing over the top and bottom portions of circle described by the foot pedal.

It is proposed in this invention to provide means whereby motion may be given to a driven member throughout the entire cycle of the driving means. The mechanical movement which I employ includes a gliding wedge as will more clearly appear as the specification proceeds.

The mechanical movement that I make use of in the present invention has many different applications, and by the way of example only I may state that it may be applied to exercising devices, bicycles, etc. I do not wish to be limited in this respect.

It is further proposed to provide a device of the character described, which is particularly efficient in operation and durable in character. Other objects and advantages will be apparent as the specification continues.

For a better understanding of my invention, reference should be had to the accompanying drawings, forming part of this application, in which:

Figure 1 is a vertical central sectional view taken through an exercising device and having my pressure drive mechanism incorporated therein, parts being shown in elevation;

Figure 2 a vertical elevation of a bicycle with my pressure drive mechanism embodied therein;

Figure 3 an elevational view of a modified form of the invention in a fragmentary illustration, parts being in section;

Figure 4 a slightly modified form of Figure 2;

Figure 5 a fragmentary elevational view of a still further modification of my pressure drive mechanism; and Figure 6 a view of a bicycle having another form of my pressure drive mechanism forming part thereof.

While I have shown only the preferred forms of my invention, it should be understood that various changes, or modifications, may be made within the scope of the appended claims without departing from the spirit of the invention.

Referring now to Figure 1, it will be noted that I provide an exercising device indicated generally at 1, which includes in its structural features a main body member 2 that is swingably connected, as at 3, to a supporting frame 4. The latter is fashioned with a horizontal guide 5 having laterally extending feet 6 resting on the floor 6' or the like.

The main body member 2 has an adjustable seat 7 mounted on one end thereof upon which an occupant can be seated while using the exercising device. A suitable handle bar 8 rises from the supporting frame 4 and passes through slots 9 and 10 in the member 2, the handle bar being arranged to be grasped by the occupant. Links or cranks 11 are swingably mounted at 12 on the opposite sides of the forward part of the member 2 and have foot pedals 13 at their lower ends, which are disposed to be engaged by the feet of the occupant.

A carriage 14 is reciprocably mounted on the guide 5 for forward and rearward movement therealong. Rollers 15 may be provided on the carriage to facilitate its movement. An inclined gliding wedge 16 is adjustably fastened to the carriage 14 by a pin 17 and adjusting means 18. A roller 19 extends from the main body member 2 and rides on the upper inclined surface 20 of the wedge 16. When the device is in normal position, the roller 19 is disposed in the lowest part 21 of the surface 20.

The links or cranks 11 are connected to the carriage 14 by a rod 22, and thus movement of the pedals 13 will operate to pull the carriage forward when the foot pedals are moved in the same direction. This forward movement of the carriage will cause the wedge 16 to move beneath the roller 19, which will lift the rear part of the main body member 2 and carry the seat and occupant therewith.

When the occupant releases the pressure on the foot pedals, the weight of the occupant acting upon the seat 7 will retract the wedge 16 rearwardly due to the roller 19 bearing against the inclined surface 20. The member 2 is thus driven in both directions at all times with substantially uniform pressure. A vacuum brake 20' prevents sudden dropping of the seat.

I desire to point out again that while I have shown and described the exercising device in some detail I do not wish to limit the use of the pressure drive mechanism to this particular field.

Referring now to Figure 2, it will be seen that I provide a bicycle 23 having a front wheel 24, a fork 25, a main frame 26 and a rear wheel 27. A carriage 28 reciprocates on a guide 29. Pedals 30 are connected to the carriage through crank arms 31 and a rod 32.

A bar 33 is swingably connected to the main frame 26, as at 34, and carries a seat 35 and a downwardly-extending integral arm 36, the latter having a roller 37 riding on the upper inclined surface 38 of the carriage 28. A sprocket wheel 39 is operatively connected to a second sprocket wheel 40 attached to the rear wheel 27 by a chain 41.

A pair of links 42 and 43 are swingably suspended from the seat-carrying bar 33, as at 44, and are pulled toward each other by a spring 45. A toothed wheel 46 is fastened to the same shaft 47'' as the sprocket 39. Pins 47 and 48 project from the lower ends of the links 42 and 43, respectively.

As the seat 35 is raised by pulling the carriage 28 in a forward direction, the pin 47 merely drags over the teeth of the wheel 46. However, the pin 48 engages with a tooth of the wheel 46 and drives the latter, which imparts turning movement to the rear wheel 27. During the downward movement of the seat under the weight of the occupant, the pin 47 engages with a tooth of the wheel 46 and drives the rear wheel still further. The wheel 46 is thus driven continuously during both the upward movement of the seat 35 when the cranks 31 are pushed forward and the subsequent return movement of the seat. No "dead spot" occurs in the cycle of the operation in which power is not transmitted to the rear wheel.

It will be noted that relatively long strokes of the operator's feet against the pedals in Figures 1 and 2 may be obtained. I wish again to mention the fact that my pressure drive mechanism is not to be limited to a bicycle.

In Figure 3 I have illustrated two supports 49 and 50 having a guide 51 extending therebetween, the guide having a carriage 52 reciprocably disposed thereon. Forward movement may be imparted to the carriage through a lever 53 and a rod 54.

A bar 55 is hinged to the support 49, as at 56, and an arm 57 extends downwardly from the bar 55 and carries a roller 58 at its lower end. The roller 58 bears upon the inclined upper surface 59 of the carriage 52. A coiled spring 59a encircles the arm 57 and urges the roller 58 against the inclined surface 59. The top of the spring rests against the cross part 60 of a bracket 61 rising from the guide 51.

Figure 3 includes the same arrangement for driving the toothed wheel 46 as in Figure 2, and like numerals have been used to designate corresponding parts, excepting that the numerals have been primed ('). The spring 59a is compressed when the carriage is drawn forward by the lever 53 and expands to return the carriage to its rearward position upon releasing the lever.

The same bicycle is shown in Figure 4 as that illustrated in Figure 2, with the exception that the seat 62 is carried by a standard 63 rising from the main frame 26 and that bar 33 is urged toward the main frame by a spring 64. In all other respects these two forms are identical in construction and operation.

Referring now to the form shown in Figure 5. The horizontal guide 65 has a carriage 66 mounted thereon, which may be pulled forward by a lever 67 and rod 68 or forced forward by a piston rod 69 projecting from a steam or other pressure containing cylinder 70. A bar 71 is hinged as at 72 to the guide 65 and has an arm projecting therefrom on which a roller 73 is mounted. This roller bears upon the inclined surface 74 of the carriage 66 and a spring 75 is arranged to urge the bar 71 toward the guide 65 and thus return the carriage to its normal position when the lever 67 is released and the cylinder 70 exhausted.

The movement of the bar 71 in Figure 5 serves to operate the toothed wheel 46 through the same mechanism as that shown in Figure 2 and corresponding numerals have been applied to designate the same parts.

In Figure 6 I have shown a wedge-shaped member 76, which is supported on two parallel links 77 rising from the main frame 78 of a bicycle. This member is pulled forward by an occupant of the seat 79 pressing forward on foot pedals 80, the latter being connected to the member 76 through cranks 81 and a rod 82. The bar 83 is hinged to the main frame at 84 and has a short arm 85 projecting therefrom. This arm carries a roller 86 that rides on the inclined surface 87 of the member 76. The seat 79 is raised by the occupant pushing the pedals 80 forward, while the weight of the occupant serves to restore the member 76 to its normal position when the pressure on the pedals is released.

Figure 6 includes the same mechanism for driving the rear wheel 27 as the form shown in Figure 2. Like numerals have been used to designate corresponding parts.

I claim:

1. In a device of the character described, a frame structure having a rotatable shaft thereon, a pair of jaws comprising upper and lower members hingedly connected together and mounted on the structure, yielding means for squeezing the jaws together, a wedge member connected to one of the jaws and being movable back and forth between them, pressure means operable to force the wedge between the jaws to spread them open, the said yielding means being operable to back the wedge out of the jaws when the pressure is released, and connection between the jaws and the said shaft for rotating the latter in response to movements of the jaws.

2. In a device of the character described, a frame structure having a rotatable shaft thereon, a pair of jaws comprising upper and lower members hingedly connected together and mounted on the structure, yielding means for squeezing the jaws together, a wedge member connected to one of the jaws and being movable back and forth between them, pressure means operable to force the wedge between the jaws to spread them open, the said yielding means being operable to back the wedge out of the jaws when the pressure is released, and connections between the jaws and the said shaft for rotating the latter in response to both opening and closing movements of the jaws.

3. In a device of the character described, a frame structure having a rotatable shaft thereon, a pair of jaws comprising upper and lower members hingedly connected together and mounted on the structure, means for moving the jaws toward each other, a wedge member movable back and forth between the jaws, pressure means operable to force the wedge between the jaws to spread them open, said first-named means being operable to back the wedge out of the jaws when the pressure of the last-named means is released, and connection between the jaws and the said shaft for rotating the latter in response to movements of the jaws.

4. In a device of the character described, a frame structure having a rotatable shaft thereon, a pair of jaws comprising upper and lower members hingedly connected together and mounted on the structure, means for moving the jaws toward each other, a wedge member movable back and forth between the jaws, pressure means operable to force the wedge between the jaws to spread them open, said first-named means being operable to back the wedge out of the jaws when the pressure of the last-named means is released, and connections between the jaws and the said shaft for rotating the latter in response to both opening and closing movements of the jaws.

5. In a device of the character described, a rotatably supported shaft, a pair of jaw members hingedly connected together and being movable toward each other, a carriage guided for movement back and forth between the jaws and having an inclined surface, one of the jaws having engagement with the said inclined surface to spread the jaws open when the carriage is moved in one direction and to back the carriage out of the jaws when the carriage is free to move and the jaws are urged toward each other, means for moving the carriage to spread the jaws, and means operable by the movement of the jaws to impart turning movement to said shaft.

6. In a device of the character described, a rotatably supported shaft, a pair of jaw members hingedly connected together and being movable toward each other, a carriage mounted on one of the jaws and being guided back and forth therealong, the carriage having an inclined surface engageable by the other jaw to spread the jaws open when the carriage is moved in one direction and to return the carriage to an initial position when the carriage is free to move and the jaws are urged toward each other, means for moving the carriage to spread the jaws, and means operable by the movement of the jaws to impart turning movement to said shaft.

7. In a device of the character described, a rotatably supported shaft having a toothed wheel thereon, a pair of jaw members hingedly connected together and being movable toward each other, a carriage guided for movement back and forth between the jaws, the carriage having an inclined surface engageable by one of the jaws to spread the jaws open when the carriage is moved in one direction and to return the carriage to an initial position when the carriage is free to move and the jaws are urged toward each other, means for moving the carriage to spread the jaws, a pair of links swingably secured to one of the jaws and having their free ends arranged on opposite sides of the toothed wheel, and means on the links engageable with the teeth of the wheel to rotate the wheel when the jaws are moved relative to one another.

8. In a device of the character described, a rotatably supported shaft having ratchet teeth thereon, the teeth all facing in the same direction, a pair of jaw members hingedly connected together and being movable toward each other, a carriage guided for movement back and forth between the jaws, the carriage having an inclined surface engageable by one of the jaws to spread the jaws open when the carriage is moved in one direction and to return the carriage to an initial position when the carriage is free to move and the jaws are urged toward each other, means for moving the carriage to spread the jaws, a pair of links swingably secured to one of the jaws and having their free ends arranged on opposite sides of the toothed wheel, and means on the links engageable with the teeth to rotate the wheel when the jaws are opened and closed.

9. In a device of the character described, a frame structure having a rotatable shaft thereon, a pair of jaws comprising an upper and a lower member movably connected together and mounted on the structure, a pressure-means for forcing the jaws towards each other and being supported by the structure, a wedge member supported on the structure for movement between the jaws, means for applying a driving pressure against the wedge to move it point first between the jaws to spread them apart, the said pressure-means being operable when the driving pressure against the wedge is withdrawn to force the latter in a reverse direction to close the jaws, and means connected to one of the three members for rotating the shaft by the latter movement.

10. In a device of the character described, a frame structure having a rotatable shaft thereon, a pair of jaws comprising upper and lower members movably connected together and mounted on the structure, a pressure-means for forcing the jaws towards each other and being supported by the structure, a wedge member supported on the structure for movement between the jaws, a pedal means for applying a driving pressure against the wedge to move it point first between the jaws to spread them apart. The said pressure-means being operable when the pedal pressure against the wedge is withdrawn to force the latter in the reverse direction to close the jaws, and means connected to one of the three members for rotating the shaft by the latter movement.

11. In a device of the character described, a pair of frames comprising an upper and a lower member movably connected together, a pressure means for forcing the members toward each other, a wedge member supported on one of the frame members for movement between the latter, and pedal means for applying pressure against the wedge to move it point first between the frame members to spread them apart, the said pressure means being operable when the pedal pressure against the wedge is withdrawn to force the latter in a reverse direction to move the frame members toward one another.

12. In a device of the character described, a frame structure comprising a lower member serving as a base member, an upper member serving as a weight-supporting member and having a seat thereon, means hingedly connecting one end of each of the two members together, a wedge operable to travel back and forth between the members, a pedal means connected to the members at the hinge end thereof and being operable to be pushed forward by the feet of an occupant of the seat to pull the wedge forward so as to pry up the upper member, the said member being operable to move the members toward one another by forcing the wedge in a reverse direction when the foot pressure is released.

13. In a device of the character described, a pair of frames hingedly connected together at one end, a wedge supported between the frames, a drive member operable to move the wedge in one direction for prying the frames apart, the frames being arranged to move toward one another and to force the wedge in the reverse direction when the driving force of the wedge is withdrawn.

14. In a device of the character described, a pair of frames comprising upper and lower members movably connected together, a pressure means for exerting pressure for forcing the frames toward each other, a wedge member supported on one of the frames for movement between the frames, a pedal means for applying a driving pressure against the wedge to move it point first between the frames to spread them apart, the said pressure means being operable when the pedal pressure against the wedge is withdrawn to force the latter in the reverse direction to urge the frames toward one another, an air cushion on the structure, and connections between said air cushion and the wedge to resist movement of the frames toward one another.

15. In a mechanical movement, a frame having a longitudinal bar and a fixed upright handle at the front portion thereof, a vehicle movable with respect to the bar rearwardly of the handle, a member pivoted to the vehicle having an inclined face rising from front to rear and having a stop merging into its lower end and screw means for adjusting the upper end thereof for changing the angularity of said face, a second frame pivoted to the first frame in front of the vehicle and near the handle and having a roller supported on the inclined face and a seat above the roller, an arm pivoted to one of said frames forwardly of the seat and the vehicle, the arm having a foot pedal at the lower end thereof adapted for actuation by the foot of a seat occupant, a link connecting the arm and the vehicle for moving the vehicle forward when the pedal is advanced and for raising the seat, the weight of the occupant causing the roller to retract the vehicle for lowering the seat and for returning the pedal to an initial position.

16. In a mechanical movement, a frame having a longitudinal bar and a fixed upright handle at the front portion thereof, a vehicle movable with respect to the bar rearwardly of the handle, and having an inclined face rising from front to rear and having a stop at its lower end, a second frame pivoted to the first frame in front of the vehicle and near the handle and having a roller supported on the inclined face and a seat above the roller, an arm pivoted to one of said frames forwardly of the seat and the vehicle, the arm having a foot pedal at the lower end thereof, adapted for actuation by the foot of a seat occupant, a link connecting the arm and the vehicle for moving the vehicle forward when the pedal is advanced and for raising the seat, the weight of the occupant causing the roller to retract the vehicle for lowering the seat and for returning the pedal to an initial position.

17. In a mechanical movement, a frame having a vehicle movable thereon, a member pivoted to the vehicle having an inclined face rising from front to rear and having a stop merging into its lower end and screw means for adjusting the upper end thereof for changing the angularity of said face, a second frame pivoted to the first frame in front of the vehicle and having a roller supported on the inclined face, pressure means urging the second frame toward the first frame, and means for advancing the vehicle for separating the frames in opposition to the pressure means.

18. In a mechanical movement, a frame having a fixed upright member thereon, a vehicle movable on the frame toward and away from the upright member and having an inclined face, a second frame pivoted to the first frame and having an element movably supported on the inclined face, a seat on the second frame disposed to allow an occupant of the seat to grip the upright member with his hands and means operable by the feet of the seat occupant for pulling the vehicle toward the upright member whereby the seat is lifted.

19. In a mechanical movement, a frame having a fixed upright member thereon, a vehicle movable on the frame toward and away from the upright member and having an inclined face, a second frame pivoted to the first frame and having an element movably supported on the inclined face, a seat on the second frame disposed to allow an occupant of the seat to grip the upright member with his hands, means operable by the feet of the seat occupant for pulling the vehicle toward the upright member whereby the seat is lifted, and means on the vehicle for adjusting the angularity of the inclined face.

20. In a mechanical movement, a frame having a seat thereon, means for pivotally supporting the frame at a point horizontally spaced from the seat, a wedge member, an element on the frame adapted to ride on the wedge member for supporting the seat, means for slidably supporting the wedge member, and means operable by coaction of the hands and the feet of a seat occupant for moving the wedge member whereby the seat is raised.

JOSEPH D. BELL.